United States Patent Office 3,105,839
Patented Oct. 1, 1963

3,105,839
BICYCLO(2.2.1)HEPT-5-ENE-2,3-DICARBOXYLIC ACID ANHYDRIDES
Alfred Renner, Basel, Switzerland, assignor to Ciba Limited, Basel, Switzerland, a company of Switzerland
No Drawing. Filed Dec. 13, 1961, Ser. No. 159,149
Claims priority, application Switzerland Dec. 16, 1960
4 Claims. (Cl. 260—346.3)

The present invention provides new dicarboxylic acid anhydrides of the formula (I)

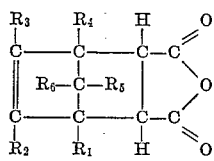

in which one of the residues $R_1$ to $R_5$ represents a hydrogen atom or a methyl group and each of the other residues $R_1$ to $R_5$ represents a hydrogen atom, and $R_6$ represents an alkenyl or alkoxyalkenyl group preferably containing 3 to 8 carbon atoms.

The two preferred representatives of this new type of compound are 7-allyl-bicyclo(2:2:1)hept-(5)-ene-2:3-dicarboxylic acid anhydride and 7-allyl-methyl-bicyclo-(2:2:1)hept-(5)-ene-2:3-dicarboxylic acid anhydride.

The monomer obtained by pyrolysis of commercial dimethyl-dicyclopentadiene is a mixture of isomers that are difficult to separate from one another. Accordingly, the last-mentioned compound is a mixture of isomers consisting predominantly of 1-methyl and 2-methyl derivatives.

The new dicarboxylic acid anhydrides of the Formula I are accessible by reacting a substituted cyclopentadiene of the formula (II)

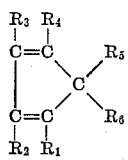

in which one of the residues $R_1$ to $R_5$ represents a hydrogen atom or a methyl group and each of the other residues $R_1$ to $R_5$ represents a hydrogen atom, and $R_6$ represents an alkenyl or alkoxyalkenyl group preferably containing 3 to 8 carbon atoms, with maleic anhydride to form Diels-Alder adducts.

The substituted cyclopentadienes of the Formula II are obtained by reacting an alkali metal compound of cyclopentadiene or methylcyclopentadiene with an alkoxyalkenyl halide, for example 5-chloro-3-pentenyl methyl ether or 3-chloro-4-pentenyl methyl ether, or with an alkenyl halide such as, for example, as but-(2)-enyl chloride, pentenyl bromide, octenyl bromide and more especially allyl chloride or allyl bromide in an organic solvent such, for example, as xylene, diethyl ether or 1:2-dimethoxyethane.

It is of adavntage to use for the Diels-Alder addition reaction according to the invention equimolecular amounts of the starting compounds. Alternatively, an excess of the diene or of the dienophilic component may be used, the excess starting product then being recovered from the reaction mixture, for example by distillation.

It is of advantage to perform the reaction at an elevated temperature ranging from 30° to 150° C. and preferably from 30° to 80° C.

The new dicarboxylic acid anhydrides of the Formula I are light-coloured liquids of low viscosity. They are excellent curing agents for epoxy resins or diepoxides or polyepoxides. As such they may be used by themselves or in admixture with other dicarboxylic or polycarboxylic acid anhydrides such, for example, as phthalic, methyl-endomethylene tetrahydrophthalic, allylsuccinic, dodecenylsuccinic, hexahydrophthalic, hexachloro-endomethylene tetrahydrophthalic, endomethylene tetrahydrophthalic, maleic succinic anhydride or pyromellitic dianhydride and, if desired, in conjunction with an accelerator such as a tertiary amine.

By virtue of the presence of a polymerisable double bond in the allyl residue, it is possible to use concomitantly for the curing an organic peroxide, such as benzoyl, lauroyl, di-tertiary butyl peroxide or methylethyl ketone hydroperoxide, if desired in combination with copolymerisable monomers such as vinyl acetate, styrene, methyl acrylate, methyl methacrylate, esters of fumaric or maleic acid, acrylonitrile, diallyl phthalate, triallylcarballate or triallyl cyanurate.

As diepoxides and polyepoxides that can be cured with the aid of the dicarboxylic anhydrides (I) there may be mentioned, for example:

Diglycidyl or polyglycidyl ethers of diols or polyols such as 1:4-butanediol or glycerol, or of diphenols or polyphenols such as resorcinol, bis-[4-hydroxyphenyl]-dimethylmethane or condensation products of formaldehyde with phenols (novolaks); polyglycidyl esters of polycarboxylic acids such as phthalic or terephthalic acid; aminopolyepoxides such as are obtained, for example, by dehydrohalogenating reaction products from epihalohydrins and primary or secondary amines such as n-butylamine, aniline or 4:4'-di-(monomethylamino)-diphenylmethane; furthermore epoxidised poly-unsaturated compounds such as epoxidised polybutadienes ("oxirones"), vinylcyclohexene dioxide, limonene dioxide, dicyclopentadiene dioxide, bis[3:4-epoxycyclohexylmethyl]-phthalate, diethylene glycol-bis[3:4-epoxycyclohexane carboxylate], 3:4-epoxy-6-methylcyclohexylmethyl-3:4-epoxy-6-methylcyclohexane carboxylate, 3:4-epoxy-hexahydrobenzal-3:4-epoxycyclohexane-1:1-dimethanol and bis(3:4-epoxyhexahydrobenzyl)formal.

The new dicarboxylic anhydrides (I) are also suitable as intermediates, for example for the manufacture of unsatured polyesters.

In the following examples parts and percentages are by weight, the relationship between part by weight and part by volume being the same as that between the kilogram and the litre.

EXAMPLE 1

*7-Allyl-Bicyclo(2:2:1)Hept-(5)-Ene-2:3-Dicarboxylic Acid Anhydride*

(a) 230 parts of sodium metal are melted under 1750 parts of a commercial mixture of xylene isomers, then finely dispersed by means of a vibro-mixer and cooled to 35° C. 100 parts of tertiary butanol are then added and while thoroughly stirring the batch with mechanical means 792 parts of monomeric cyclopentadiene are added dropwise. The temperature is maintained by external cooling at about 40° C. When hydrogen is no longer being evolved, 840 parts of allyl chloride are added while externally cooling to maintain the temperature at 40 to 50° C. The reaction is allowed to subside at 35 to 40° C., and the sodium chloride formed is washed out with water.

980 parts of maleic anhydride are then vigorously stirred portionwise into the xylene solution of the resulting allylcyclopentadiene at a rate such that the temperature remains at 30 to 40° C. The batch is allowed to react for another 2 hours at 80° C., the solvent is distilled off under vacuum and the product is purified. 1296 parts of the dicarboxylic anhydride of the formula

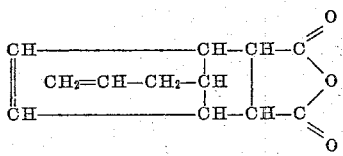

pass over between 130 and 138° C., under 0.3 mm. Hg pressure as a light-yellow liquid, corresponding to 64.5% of the theoretical yield. The resulting dicarboxylic anhydride reveals the following characteristic data.

Refraction index _____ $n_D^{20}$=1.5144.
Viscosity at 20° C_____ 207 centipoises.

Content of anhydride groups per kg.:

Found _____ 4.90 equivalents.
    Calculated _____ 4.90 equivalents.

(b) When the process for the manufacture of 7-allyl-bicyclo(2:2:1)hept-(5)-ene-2:3 - dicarboxylic anhydride described under (a) above is carried out with the use of diethyl ether (instead of xylene) as solvent, the primarily formed monoallylcyclopentadiene of the formula

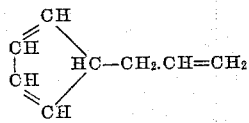

can be obtained in pure form in a yield of 30% of the theoretical after having removed the solvent by distillation. It boils under a pressure of 16 mm. Hg at 30° C. and reveals the following characteristic data:

| Elementary analysis | C | H |
|---|---|---|
| calculated_____percent__ | 90.50 | 9.50 |
| found_____do____ | 90.79 | 9.46 |
| Refraction index_____ | $n_D^{20}$=1.4803 | |

The examination for double bonds by catalytic hydrogenation revealed 2.9 double bonds per molecular proportion. In addition, a yield of 28% of the theoretical diallyldicyclopentadiene (boiling at 139° C. under a pressure of 16 mm. Hg) of the formula

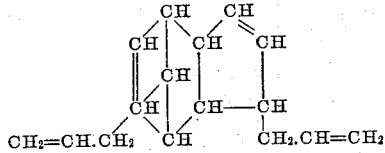

is obtained, which latter product revealed the following characteristic data:

| Elementary analysis | C | H |
|---|---|---|
| calculated_____percent__ | 90.50 | 9.50 |
| found_____do____ | 90.61 | 9.45 |
| Refraction index_____ | $n_D^{20}$=1.5115 | |

Determination of double bond content by catalytic hydrogenation: 4.09 double bonds per molecular proportion.

When the resulting monomeric allylcyclopentadiene is reacted with an equivalent amount of maleic anhydride in boiling ether, there is obtained a quantitative yield of the 7 - allyl-bicyclo(2:2:1)hept-(5)-ene-2:3-dicarboxylic acid anhydride described under (a).

EXAMPLE 2

7-Allyl-1-(or 6)-Methyl-Bicyclo(2:2:1)Hept-(5)-Ene-2:3-Dicarboxylic Acid Anhydride The procedure is as described in Example 1(a), except that 960 parts of monomeric methylcyclopentadiene are used instead of 792 parts of cyclopentadiene.

The resulting dicarboxylic anhydride of the probable formula

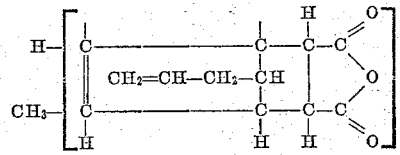

is obtained in a yield comparable to that of Example 1(a); it is purified by distillation at 125–132° C. under a pressure of 0.75 mm. Hg. The resulting dicarboxylic acid anhydride was characterised by the following data.

Refraction index_____ $n_D^{20}$=1.5113.
Viscosity at 20° C_____ 290 centipoises.

Content of anhydride groups per kg.:

Found _____ 4.63 equivalents.
    Calculated _____ 4.58 equivalents.

EXAMPLE 3

7-(Oct-[1']-Ene-[3']-Yl)-Bicyclo(2:2:1)Hept-(5)-Ene-2:3-Dicarboxylic Acid Anhydride 11.4 parts of sodium metal are melted under 173 parts of a commercial mixture of xylene isomers, then finely dispersed with the aid of a rotary emulsification apparatus and cooled to 35° C. 1.5 parts of tertiary butanol are added, and while thoroughly stirring the batch by mechanical means 36 parts of monomeric cyclopentadiene are dropped in. The temperature is maintained at about 40° C. by external cooling. When hydrogen is no longer being evolved, there are added (while continuing the external cooling) at 30–35° C. 90 parts of 3-bromo-1-octene prepared as described below. The reaction is allowed to subside at 26–33° C., the sodium chloride formed is filtered off and the salt is washed with 4 x 40 parts of xylene.

With vigorous stirring 46.1 parts of maleic anhydride are added to the xylene solution of the octenylcyclopentadiene formed, and the whole is heated for 2 hours at 110 to 130° C., whereupon the solvent is removed under vacuum and the product is distilled under a high vacuum.

There are obtained 47.8 parts of a main fraction passing over between 113 and 137° C. under 0.15 mm. Hg pressure, consisting of crude 7-(oct-[1']-ene-[3']-yl)-bicyclo(2:2:1)hept - (5) - ene-2:3-dicarboxylic anhydride, which was characterised as follows.

Equivalents

Determination of anhydride groups per kg.:
    Found _____ 3.50
    Calculated _____ 3.65

The 3-bromo-1-octene used above was prepared in known manner from 1-octene and N-bromosuccinimide in carbon tetrachloride by irradiation with a source of ultraviolet light. It revealed the following characteristic data: Boiling point: 84–86° C. under 18 mm. Hg pressure. Refraction index: $n_D^{20}$=1.4884. Bromine content: found 41.16%, calculated 41.81%.

EXAMPLE 4

Mixture of Isomeric 7-(5'-Methoxy-pent[2']-Ene-[1']-Yl-Bicyclo(2:2:1)Hept-(5)-Ene-2:3-Dicarboxylic Acid Anhydride and 7-(5'-Methoxy-Pent-[1']-Ene-[3']-Yl)-Bicyclo(2:2:1)Hept-(5)-Ene-2:3

A suspension of cyclopentadienyl sodium in 173 parts of xylene (prepared from 23 parts of sodium, 3 parts of tertiary butanol and 79.2 parts of cyclopentadiene) is mixed with 134.5 parts of a mixture of isometric chloropentenyl-methyl ethers prepared as described below at 30° C. with stirring and external cooling. The sodium chloride formed is filtered off and 88.2 parts of maleic anhydride are added in portions to the filtrate.

The reaction product is subjected to high-vacuum distillation, to yield 107.1 parts of a main fraction boiling between 152 and 164° C. under 0.5 mm. Hg, consisting of a mixture of isomeric 7-(5'-methoxy-pent[2']-ene-[1']-yl)-bicyclo(2:2:1)hept-(5)-ene-2:3-dicarboxylic anhydride and 7-(5'-methoxy-pent-[1']-ene-[3']-yl)-bicyclo(2:2:1)-hept(5)-ene-2:3. It was characterised as follows.

Determination of anhydride groups per kg.: Equivalents
Found _____ 3.48
Calculated _____ 3.82

| Elementary analysis | C | H |
|---|---|---|
| found_____percent__ | 67.85 | 7.1 |
| calculated_____do____ | 68.7 | 6.9 |

The mixture of the isomeric chloropentenyl-methyl ethers (namely 5-chloro-3-pentenyl methyl ether and 3-chloro-4-pentenyl methyl ether) was prepared in known manner by reacting 322 parts of chloromethyl methyl ether with 324 parts of butadiene and 39 parts of zinc chloride in 210 parts of glacial acetic acid. The reaction product was mixed with ice water, separated and washed with dilute sodium hydroxide solution. Vacuum distillation yielded 136.3 parts of a main fraction boiling between 64 and 70° C. under 17 mm. Hg pressure. Refraction index: $n_D^{20}=1.4522$. It contained 25.78% of chlorine (theory: 26.34%).

EXAMPLE 5

52 parts of a polyglycidyl ether resin which is liquid at room temperature and contains 5.4 epoxide equivalents per kg, prepared by reacting epichlorohydrin with bis[4-hydroxyphenyl]-dimethylmethane (bisphenol A) in the presence of alkali, 48 parts of the dicarboxylic anhydride prepared as described in Example 1 [7-allyl-bicyclo(2:2:1)-hept-(5)-ene-2:3-dicarboxylic anhydride] and 1 part of tris(dimethylamino-methyl)-phenol are mixed at room temperature, to form a solution which is at room temperature of low viscosity and easy to cast. The resulting mixture is cast in aluminum moulds and cured for 10 hours at 120° C. and then for 14 hours at 180° C.

The cured castings revealed the following properties:

Bending strength_____ 12.7 kg./mm.².
Impact bending strength_____ 6.6 cm. kg./cm.².
Mechanical shape stability on heating,
   according to Martens (DIN)_____ 112° C.

Example 6

50 parts of the polyglycidyl ether resin used in Example 5, 50 parts of the dicarboxylic acid anhydride manufactured as described in Example 2 [7-allyl-methyl-bicyclo(2:2:1)hept-(5)-ene-2:3-dicarboxylic anhydride], 1 part of tris(dimethyl-aminomethyl)-phenol and 2 parts of benzoyl peroxide are mixed at room temperature and the resulting liquid mixture is cast in moulds and cured as described in Example 5.

The cured castings revealed the following properties:

Bending strength_____ 11.8 kg./mm.².
Impact bending strength_____ 7.7 cm. kg./cm.².
Mechanical shape stability on heating,
   according to Martens (DIN)_____ 107° C.

Example 7

100 parts each of an epoxy resin which is liquid at room temperature contains 5.3 epoxide equivalents per kg., and has been prepared by reacting bis(4-hydroxyphenyl)-dimethylmethane with epichlorohydrin in the presence of alkali, are mixed at room temperature with 2 parts of tris(dimethylaminomethyl)-phenol. In a first test the curing agent used is the allylendomethylene tetrahydrophthalic anhydride (containing 4.91 anhydride equivalents per kg.) prepared as described in Example 2; in a second test the methylallyl endomethylene tetrahydrophthalic anhydride of Example 2 (4.56 anhydride equivalents per kg.), and in a third test the known methylendomethylene tetrahydrophthalic anhydride is added at room temperature, in each case in an amount of 0.85 anhydride equivalent per epoxide equivalent.

The resulting specimens of casting resins are poured at room temperature into aluminium moulds (140 x 40 x 10 mm.) and cured for 24 hours at 140° C. and then for 24 hours at 240° C.

The mechanical shape stability on heating, according to Martens (DIN), of specimens 1 to 3 is compared in the following table.

Specimen: Shape stability according to Martens (DIN), in ° C.
1_____ 245
2_____ 176
3_____ 154

Using a further amount of specimens 1 and 2 each, strips of aluminium, marketed under the trademark "Anticorodal B" (170 x 25 x 1.5 mm.; 10 mm. overlap), are cemented together at room temperature and then cured for 24 hours at 140° C. and thereupon for 24 hours at 200° C. Tensile shear strength of the cemented specimens: 1—1.9 kg./mm.², 2—1.7 kg./mm.².

What is claimed is:

1. A compound of the formula

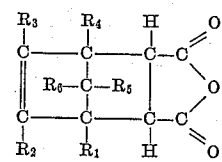

in which one of the radicals $R_1$ to $R_5$ represents a member selected from the class consisting of hydrogen atom and the methyl group and the remaining radicals $R_1$ to $R_5$ each represent a hydrogen atom, and $R_6$ is selected from the class consisting of alkenyl group of 3 to 8 carbon atoms and alkoxyalkenyl group of 3 to 8 carbon atoms.

2. 7-allyl-bicyclo(2:2:1)hept-(5)-ene-2:3-dicarboxylic acid anhydride.

3. 7-allyl-1-methyl-bicyclo(2:2:1)hept-(5)-ene-2:3-dicarboxylic acid anhydride.

4. 7-allyl-6-methyl-bicyclo(2:2:1)hept-(5)-ene-2:3-dicarboxylic acid anhydride.

No references cited.